Sept. 24, 1968     H. D. KAUFFMAN     3,403,241
INDUCTION HEATING ELEMENT
Filed Aug. 22, 1966
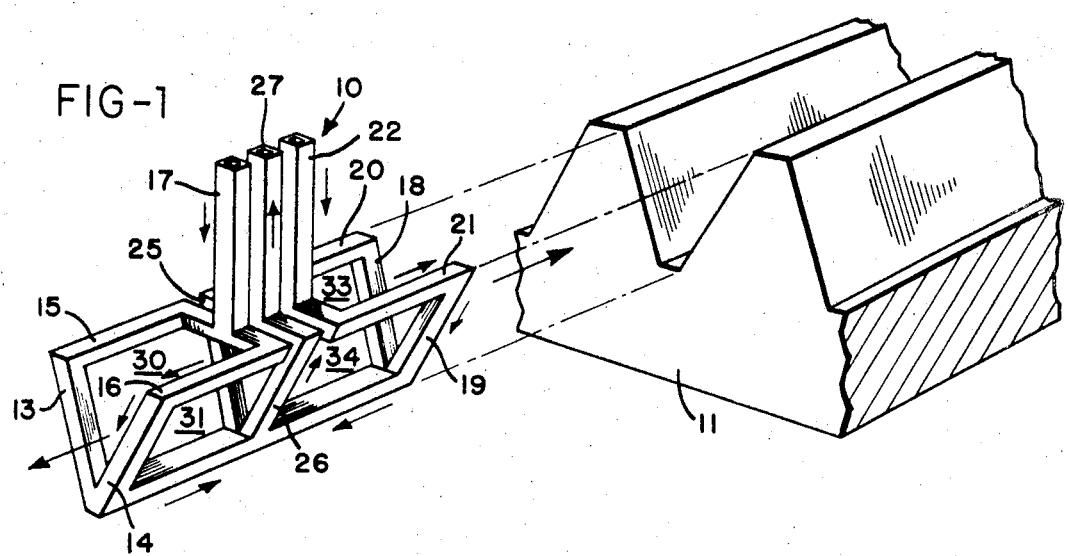
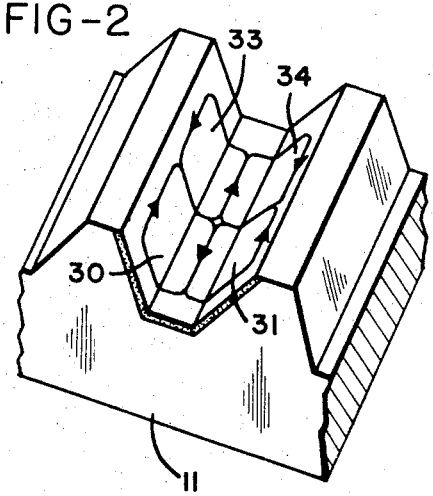
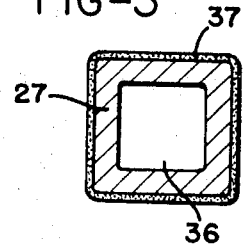
INVENTOR.
HARRY D. KAUFFMAN
BY *Marechal, Biebel, French & Bugg*
ATTORNEYS

3,403,241
INDUCTION HEATING ELEMENT
Harry D. Kauffman, Cincinnati, Ohio, assignor to The Ohio Crankshaft Co., Cleveland, Ohio, a corporation of Ohio
Filed Aug. 22, 1966, Ser. No. 573,964
5 Claims. (Cl. 219—10.59)

This invention relates to an improved high frequency shaped inductor for heat treating gears and other shaped metallic objects.

It has been the practice in the prior art, in heat treating gears in other serrated metal parts, to apply a flame to the gear trough and flanks in order to raise the metal to the required temperature for heat treating. The part may be then quenched in a cooling fluid, such as oil or water. It has also been known to place a high frequency induction coil adjacent a metal part to induce an electrical current in the surface of the part to cause heating thereof. Both of the above described methods for heat treating a shaped metal part, however, do not permit the accurate placement of the heat to the surfaces of that part.

In the present invention, a shaped high frequency inductor is used to place the heat accurately on the metal part such that only so much of that part as desired will be treated. This is accomplished by constructing the inductor from a plurality of coils arranged in the shape of the gear tooth, or other part, and by passing this shaped inductor between the flanks of the tooth while applying a high frequency alternating current through the inductor coils. An electrical current will then be induced in the surface of the metal which will cause heating to a depth which is inversely proportional to the frequency of the applied current. In a preferred embodiment of this invention, the inductor coils are placed adjacent the tooth flanks and relative movement between the inductor and the gear causes the heat to flow in the direction of movement of the inductor. Cooling fluid is passed through the inductor to maintain the inductor coils cool. Following the inductor, a water or oil spray may be used to quench the part to cause hardening.

By constructing the inductor from hollow conductive tubes and by eliminating any excessively heavy conductors, the weight of the inductor element itself may be reduced. This permits the mounting of several inductors on a common indexing head, permitting the simultaneous heat treatment of several gear teeth.

Accordingly, it is an object of this invention to provide a lightweight high frequency inductor element which may be formed to correspond to the shape of the article, such as a gear tooth, which is to be heat treated.

It is another object of this invention to provide a shaped high frequency inductor having hollow conductor elements through which cooling fluid may be passed to reduce the power loss in the inductor itself and thereby retain the rigidity and strength of the conductor material.

It is another object of this invention to provide a shaped high frequency inductor of such a character that a plurality of inductors may be connected in series and mounted on a common holder or carrier so that several gear teeth or shaped articles may be heated simultaneously.

These and other objects and advantages of this invention will be apparent from the following description, the accompanying drawings and the appended claims.

In the drawings:

FIG. 1 is a pictorial view of the shaped high frequency inductor of this invention showing its relative association with the article to be heat treated;

FIG. 2 is a pictorial view of a portion of a gear or rack showing the paths in the trough and adjacent tooth flanks of the current induced by the high frequency inductor of this invention; and FIG. 3 is a cross-sectional view of one conductor showing the insulating layer.

Referring now to FIG. 1, which shows a preferred embodiment of an inductor element constructed according to this invention, the inductor 10, which may be constructed of hollow copper tubes, is shaped to the contour of a portion of the article to be heated. These tubes are in the shape of a letter V in the embodiment shown in FIG. 1 and correspond to the shape of a portion of gear 11 to be heat treated. An elongated conductor 12 is positioned to lie in the trough area between adjacent tooth flanks of the gear 11 and has extending from the left hand end a pair of conductors 13 and 14 which are arranged to be substantially parallel to the gear tooth flanks. At the upper ends of conductors 13 and 14 are formed members 15 and 16 which also lie adjacent the tooth flank and which are positioned parallel to the elongated conductor 12. Conductors 15 and 16 are joined at approximately the mid-portion of the inductor to a common conductor 17. In like manner, the right hand portion of the inductor is also formed from a pair of conductors 18 and 19 joined at their lower ends to the conductor 12 and connected to a common conductor 22 near the mid-portion of the inductor.

Extending from a mid-portion of the conductor 12 are conductors 25 and 26 which extend upwardly along the flanks of the tooth and then are joined by an electrical conductor 27. Both conductors 17 and 22 are adapted to be connected to one side of the secondary winding of a high voltage, high frequency transformer while conductor 27 is connected to the other side of this winding. This arrangement provides four electrically parallel coils which are so positioned that the plane of each coil is substantially parallel to the surface of the tooth flank. Conductors 13, 15 and 25, and a portion of conductor 12 thus form a coil or primary winding 30, shown schematically in FIG. 2, adapted to lie parallel to one tooth flank, while conductors 14, 16 and 26, and the same portion of conductor 12 form another coil 31 lying parallel to the adjacent tooth flank. The coils 33 and 34 formed in like manner on the right hand portion of the inductor 10 will have instantaneous current which flow in a direction opposite to those currents in the coils 30 and 31 at any given time. While the inductor may be in the form of a V in the case where a gear tooth is to be heat treated, it is understood that the indutcor may be formed into any shape to correspond to the contour of the article to be treated.

The instantaneous current induced in the gear will follow the path indicated by the arrows in FIG. 2, and will form a corresponding heating pattern. It will be noted that the current induced and the heat produced between the set or pair of coils adjacent one workpiece surface will be double that induced by a single coil. As the inductor 10 moves relative to the workpiece 11, the current paths induced in the surface of the tooth flanks will also move and cause the heat to flow in the direction of movement of the inductor. A spraying nozzle (not shown) may be mounted to follow the inductor to quench the heated workpiece. Alternatively, the workpiece may be immersed in a quenching bath after each pass of the inductor.

The inductor 10, as shown in FIG. 1, may be formed from hollow copper tubing which is preferably square in cross section. Each of the conductors comprising the inductor are carefully assembled so that coolant may be pumped through each portion of the inductor to help maintain it cool relative to the article being heat treated and to dissipate the heat generated by electrical losses in the inductor itself. The coolant fluid, which may be water, is applied through the hollow center 36 of conductor 27 and through conductors 25 and 26 to conductor 12 where it divides and flows through both the right hand and left hand coils and is discharged from conductors 17 and 22.

The exterior portion of the perferred embodiment of the inductor may be coated with a ceramic insulating material 37 of approximately .010 inch thickness as shown in FIG. 3. The primary purpose of this insulator is to provide electrical insulation between the coil and the workpiece. It has been found that the voltages on the inductor may reach as high as 3,000 to 18,000 volts when a radio frequency type generator is used. Therefore, the metallic coil parts of the inductor should not be allowed to touch the workpiece since arcing may occur and effectively short out a portion of the coil.

It is also desired to keep the inductor from physically contacting the workpiece since the cooling fluid which passes through the inductor may act as a heat sink and thereby prevent the proper heating of the article. For this reason, as well as for electrical isolation, the copper conductors which comprises the inductor and the workpiece will be maintained separated by at least the thickness of the ceramic insulator material.

In practice, the coupling between the inductor and the article being treated is maintained within the range of .060–.010 inch, the lower limit being, of course, the usual thickness of the insulating material on the inductor. The separation of the inductor and the workpiece will determine the amount of power which is consumed by the workpiece, and consequently the temperature to which the surface of the workpiece is raised. This temperature, along with the degree of quenching provided, will determine the degree of hardness of the surface.

The depth to which the heat resulting from the induced electrical currents may penetrate into the workpiece may be controlled by varying the frequency of the voltage applied to the inductor if other factors, such as thermal conductivity and resistivity of the workpiece and the electrical input power to the inductor, remain constant. Under these conditions, it has been found that increasing the frequency of the power source will cause the depth of heat penetration to decrease. In one example, an applied frequency of ten kilocycles was found to give a depth of current penetration of .035 inch while a power supply frequency of 450 kilocycles gave a depth of current penetration of only .005 inch on the same article.

The inductor which has been described is therefore capable of being used over a wide range of applied frequencies with a minimum of hysteresis losses which would be inherent in the prior art inductors utilizing a metal core. In addition, overheating and possible deformation of the inductor is avoided by providing cooling passages through the inductor coils themselves.

The use of an air core inductor also permits several inductors to be mounted on a common holder or carrier thereby allowing a plurality of gear teeth or other shaped articles to be heat treated simultaneously. By using a lightweight inductor of the type described, the inductor itself may be readily moved across the workpiece, which is advantageous when working on heavy or cumbersome articles.

While the form of apparatus herein described constitutes the preferred embodiment of the invention, it is to be understood that the invention is not limited to this precise form of apparatus and that changes may be made therein without departing from the scope of the invention which is defined in the appended claims.

What is claimed is:

1. An air core armature for inducing electrical currents into the surface of a workpiece such as a gear comprising, a first pair of coils in said armature arranged in adjoining relation and forming the approximate boundaries of a first surface to induce electrical currents into a corresponding first surface of the workpiece, said coils sharing a common conductor for a portion thereof to cause the instantaneous current to flow through said coils in opposite directions, a second pair of coils in said armature also arranged in adjoining relation and forming the approximate boundaries of a second surface to induce electrical currents in a corresponding second surface of the workpiece, said second pair of coils also sharing a common conductor for a portion thereof to cause the instantaneous current to flow through said second set of coils in opposite directions, and all of said coils being formed from hollow electrically conductive material providing conduits through which cooling fluid may be circulated during the passage of electrical current through said coils.

2. The armature as defined in claim 1 wherein said armature is further arranged with adjacent coils in each of said pairs sharing common conductors.

3. In an induction heating device particularly adapted for heating toothed workpieces such as gears during heat treatment processing of the tooth surfaces, the combination of two sets of conductor coils mounted in diverging relation corresponding to the relation of the tooth flank surfaces of adjacent gear teeth, each set of coils including at least two coils having one common conductor and extending along and defining a surface corresponding to one of the tooth flank surfaces whereby flow of alternating current through each of said set of coils will result in opposed current flow through the respective coils of each set at any instant, and means for mounting a toothed workpiece and said sets of coils for relative movement during which the respective sets of coils induce electrical heating currents in opposed wall surfaces of adjacent teeth.

4. The induction heating device as defined in claim 3 wherein cooling passages are provided in said conductor coils to avoid overheating and possible deformation of the coils.

5. The induction heating device as defined in claim 3 wherein a heat and electrically insulative coating is provided at least on those portions of coils facing tooth flank surfaces.

References Cited

UNITED STATES PATENTS 2,810,054 10/1957 Jones _____ 219—10.59
3,185,808 5/1965 Sorensen et al. __ 219—10.59 X RICHARD M. WOOD, *Primary Examiner.*

L. H. BENDER, *Assistant Examiner.*

PO-1050
(5/69)

UNITED STATES PATENT OFFICE
CERTIFICATE OF CORRECTION

Patent No. 3,403,241            Dated   September 24, 1968

Inventor(s)   Harry D. Kauffman

It is certified that error appears in the above-identified patent and that said Letters Patent are hereby corrected as shown below:

Column 1, lines 3 and 4, "The Ohio Crankshaft Co."
should be -- Park-Ohio Industries, Inc. --.

SIGNED AND
SEALED
FEB 3 1970

(SEAL)
Attest:

Edward M. Fletcher, Jr.
Attesting Officer

WILLIAM E. SCHUYLER, JR.
Commissioner of Patents